(12) United States Patent
Bailey et al.

(10) Patent No.: US 6,244,849 B1
(45) Date of Patent: Jun. 12, 2001

(54) EXTRUDER DIE ASSEMBLY

(75) Inventors: Albert J. Bailey, Lebanon; Samwood M. Cafferata, Corvallis; Kirk R. Hanawalt, Albany; Martin A. Ronkin, Salem, all of OR (US)

(73) Assignee: Entek Manufacturing Inc., Lebanon, OR (US)

( * ) Notice: Subject to any disclaimer, the term of this patent is extended or adjusted under 35 U.S.C. 154(b) by 0 days.

(21) Appl. No.: 09/277,057

(22) Filed: Mar. 26, 1999

(51) Int. Cl.[7] .................................................. B29C 47/08
(52) U.S. Cl. ...................... 425/188; 425/192 R; 425/197; 425/198
(58) Field of Search ............................... 425/188, 192 R, 425/197, 198

(56) References Cited

U.S. PATENT DOCUMENTS

| | | | |
|---|---|---|---|
| 2,078,100 | * | 4/1937 | Royle ................................ 425/192 R |
| 2,449,625 | * | 9/1948 | Stuart, II ............................. 425/188 |
| 3,108,326 | * | 10/1963 | Thiel ................................. 425/192 R |
| 3,632,279 | * | 1/1972 | Christy et al. ..................... 425/192 R |
| 5,221,541 | * | 6/1993 | Arbour et al. ....................... 425/188 |
| 5,762,975 | | 6/1998 | Rockstedt . |

* cited by examiner

Primary Examiner—Nam Nguyen
Assistant Examiner—Joseph Leyson
(74) Attorney, Agent, or Firm—Robert E. Howard

(57) ABSTRACT

An extruder die assembly adapted for attachment to the output end of an extruder barrel. The die assembly includes an adapter member and a die head. The adapter member is attached to the extruder barrel, and the die head is pivotally attached to the adapter member by a hinge. The die head can be rotated about the hinge from a first, closed position to a second, open position. First and second clamp plates are slidably attached to the adapter member. The clamp plates are movable from a first, clamping position to a second, unclamped position, and have clamp fingers extending therefrom. The die head has clamp ears extending therefrom in a location such as to lockingly engage the clamp fingers when the die head is in its closed position and the clamp plates are in their clamping position. The clamp fingers and clamp ears are configured to lockingly engage each other by means of tongue and groove joints. A die plate is removably attached to the outer face of said die head by a plurality of bolts passing through slots in the die plate which, when loosened, permits the die plate to be slid into a position wherein the heads of the bolts are aligned with enlarged openings in the slots.

8 Claims, 5 Drawing Sheets

EXTRUDER DIE ASSEMBLY

BACKGROUND OF THE INVENTION

This invention relates to a die assembly used for extruding thermoplastic materials.

In the extrusion of thermoplastic materials, a die head is typically attached to the output end of an extruder barrel by bolts. To clean or change such die heads, or to remove screws from the extruder barrel, the die head must be unbolted from the end of the extruder and all bolts, thermocouples, and electrical connections attached to the die head disconnected, all of which entails a great deal of labor and down time.

SUMMARY OF THE INVENTION

It is an object of this invention to provide a die assembly which is easy to clean, does not require disconnection of attachment bolts or electrical and thermocouple connections, and allows screws to be removed from the extruder barrel without removing the die.

It is a further object of this invention to provide a die head having a die plate that can be removed without removing fasteners.

The die assembly of the present invention comprises a die head which is pivotally attached to the output end of an extruder barrel, the die head being locked into place and unlocked by slidable clamping means.

DESCRIPTION OF THE PREFERRED EMBODIMENTS

Figure 1:
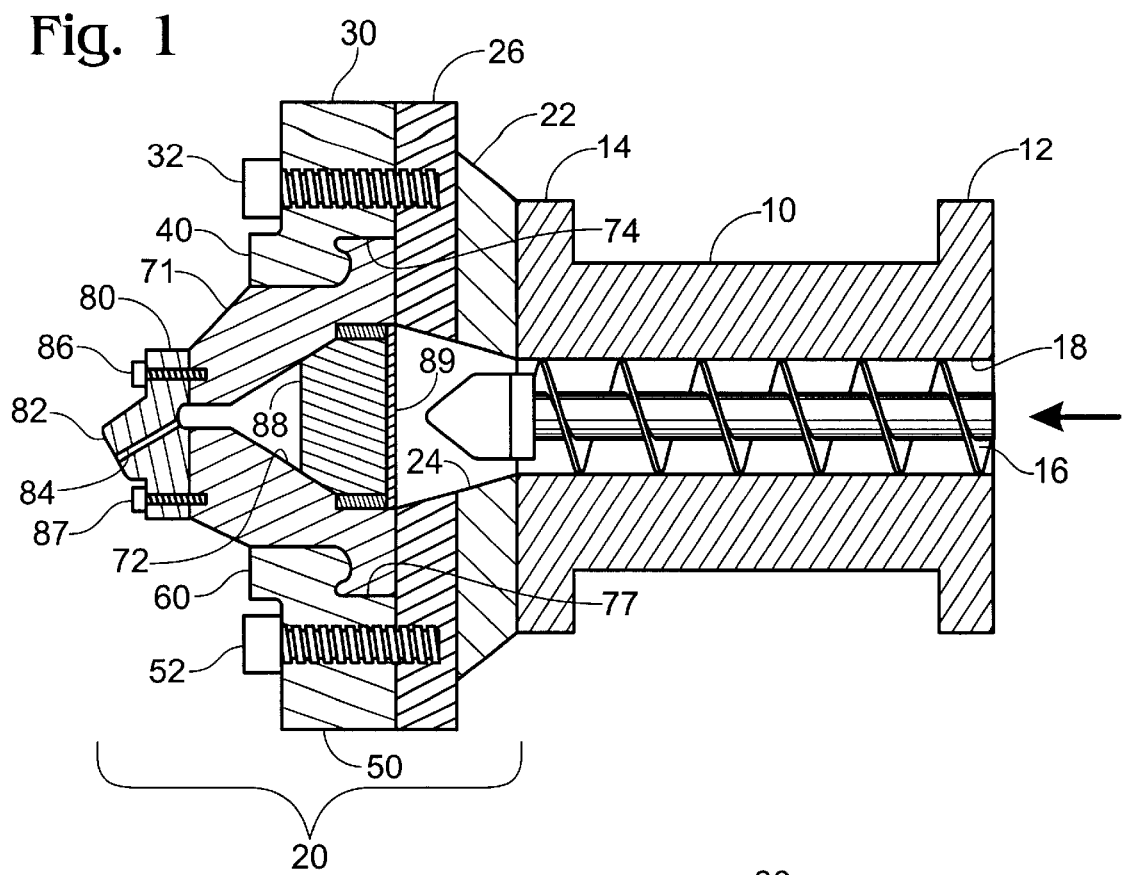
FIG. 1 is a side view, in cross-section, of the die assembly of the invention.
Figure 2:
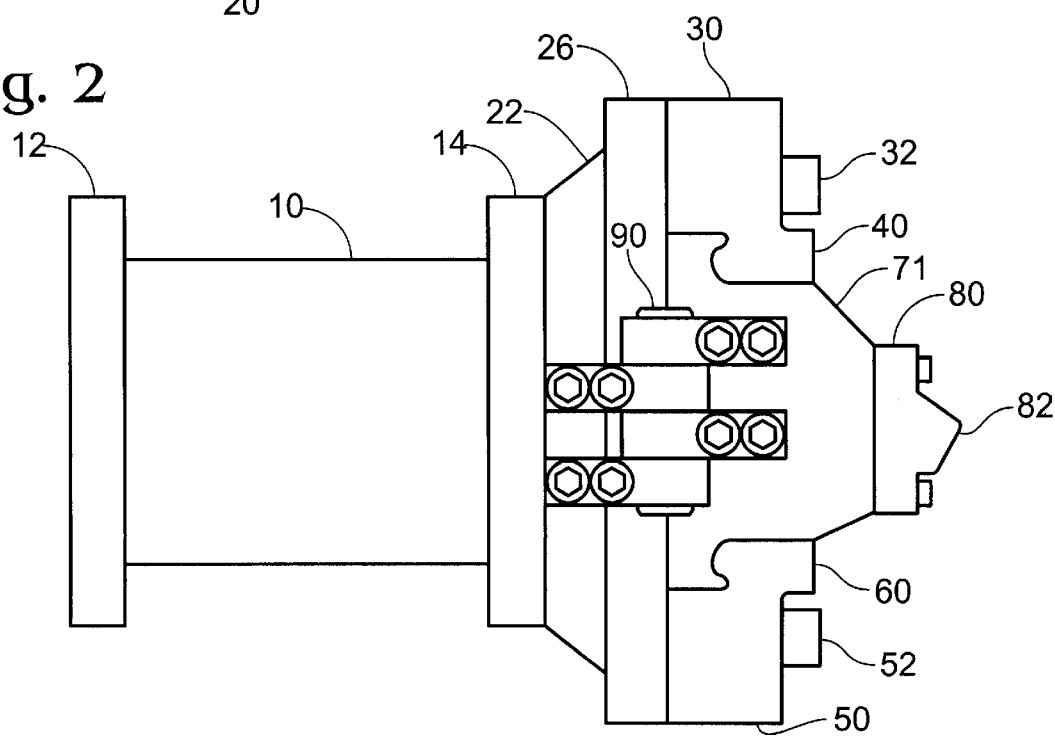
FIG. 2 is a side view of the opposite side of the die assembly of the invention.
Figure 3:
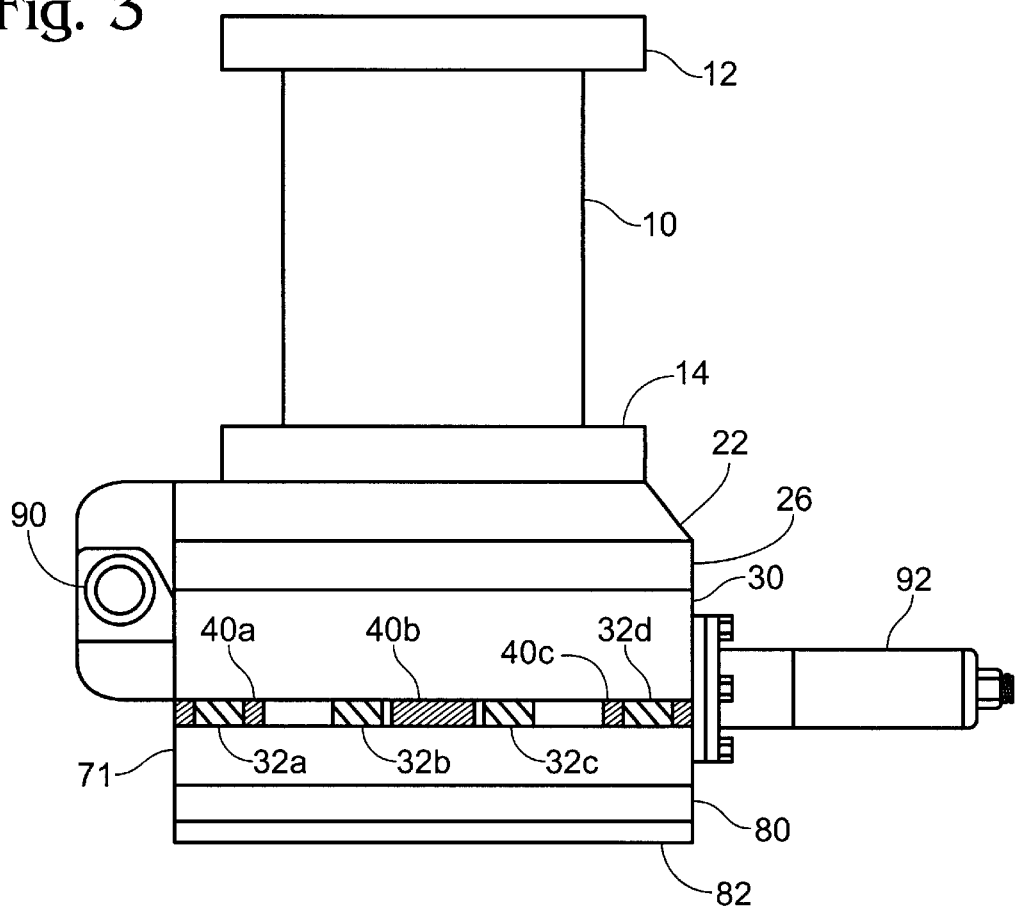
FIG. 3 is a top view of the die assembly of the invention with the die head shown in its locked and closed position.

In FIG. 1, the end barrel segment body 10 of an extruder is shown. Barrel segment body 10 has a first flange 12 on its inner (upstream) end and a second flange 14 on its outer (downstream) end. In operation, flange 12 would be attached to an adjacent (upstream) extruder barrel segment in a manner well known in the art, the extruder barrel being typically made up of a plurality of such barrel segments similar to barrel segment 10.

A terminal extruder screw segment 16 is located in a bore 18 centrally and longitudinally located in terminal barrel segment body 10. The arrow in FIG. 1 indicates the direction of flow of plasticized material through barrel segment 10.

The extruder type with which the die assembly of the present invention may be used can be either a single screw extruder or a twin screw extruder, both of which types are well known in the art, or with any device which supplies molten polymer to a die.

The die assembly 20 of the invention has an adapter section 22 which is attached to the outer flange 14 of barrel segment 10 by bolts (not shown) or other suitable attachment means.

The outer (downstream) face of adapter 22 has a face plate 26 attached thereto by any suitable attachments means, such as bolts, welding, etc. Alternatively, adapter 22 and plate 26 could be formed as a single piece.

A transitional cavity 24 is centrally located within adapter section 22 and face plate 26. As shown, cavity 24 has an inner (upstream) periphery that is coextensive with the outlet periphery of bore 18 of barrel segment 10.

Figure 5:
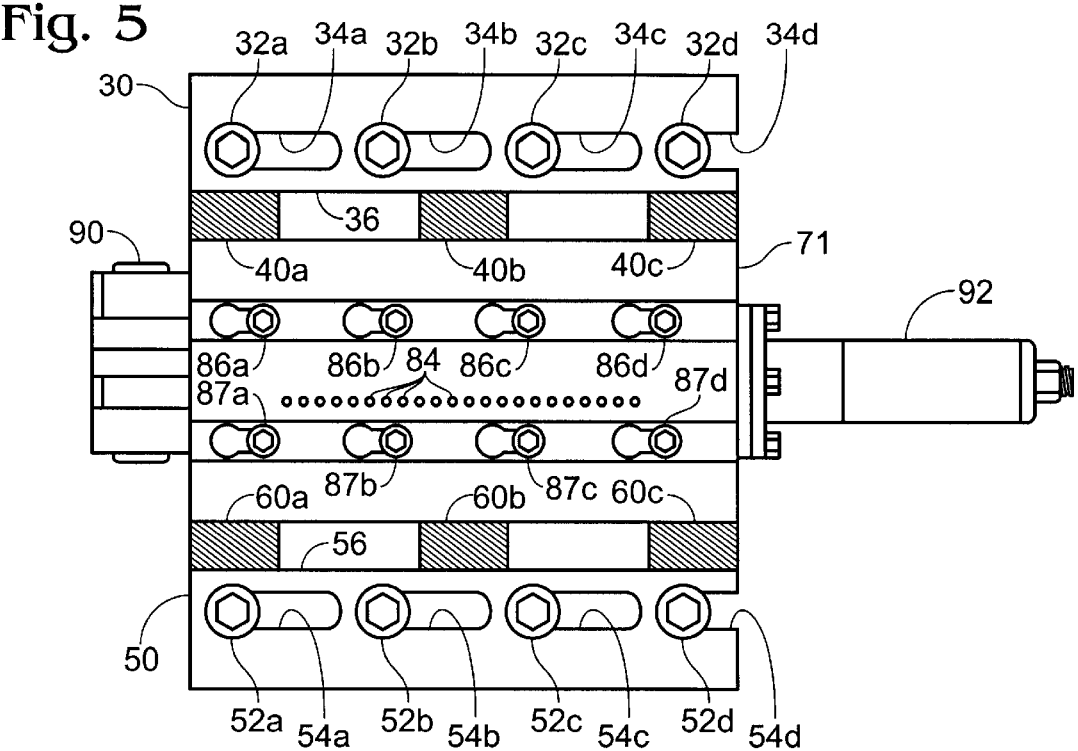
FIG. 5 is a front view of the die assembly showing the slidable clamping means in their locked position.

Face plate 26 of adapter 22 has an upper clamp plate member 30 releasably attached thereto by means of four identical locking bolts 32a, 32b, 32c, and 32d. As best seen in FIG. 5, locking bolts 32a, 32b, 32c, and 32d pass through horizontal slots 34a, 34b, 34c, and 34d, respectively, located in upper clamp plate member 30.

Upper clamp plate member 30 has three clamp fingers 40a, 40b, and 40c depending from the bottom 36 thereof, clamp fingers 40a and 40c being located at the ends thereof and clamp finger 40b being located in the middle thereof. Clamp fingers 40 are preferably formed integral with upper clamp plate member 30, but can be formed as separate pieces and welded or otherwise attached to the bottom 36 of upper clamp plate member 30.

Figure 7:
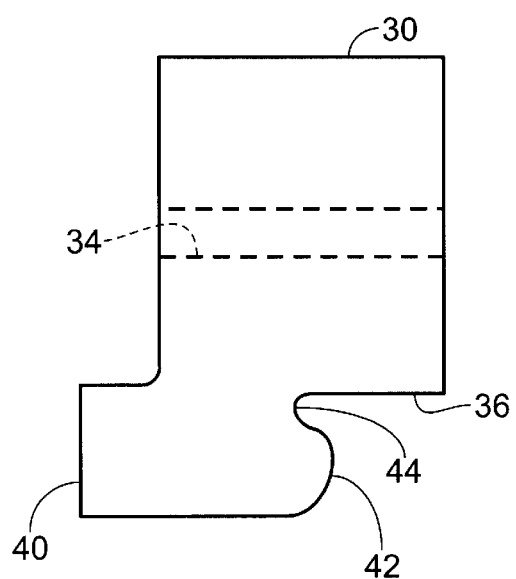
FIGS. 7 and 8 are side views of the clamp fingers of the upper and lower clamp plates, respectively.

A single, enlarged clamp finger 40 is illustrated in FIG. 7. As can be seen, clamp fingers 40 have a tongue 42 and a groove 44 extending horizontally across the rear thereof.

Similarly a lower clamp plate member 50 is releasably attached to the face 26 plate of adapter 22 by means of four locking bolts 52a, 53b, 52c, and 52d which pass through horizontal slots 54a, 54b, 54c, and 54d, respectively, located in lower clamp plate member 50.

Lower clamp plate member 50 has three clamp fingers 60a, 60b, and 60c extending from the top 56 thereof, clamp fingers 60a and 60c being located at the ends thereof and clamp finger 60b being located in the middle thereof. Clamp fingers 60 are preferably formed as an integral part of lower clamp plate member 50, but can be formed as separate pieces and welded or otherwise attached to the top 56 of lower clamp plate member 50.

Figure 8:
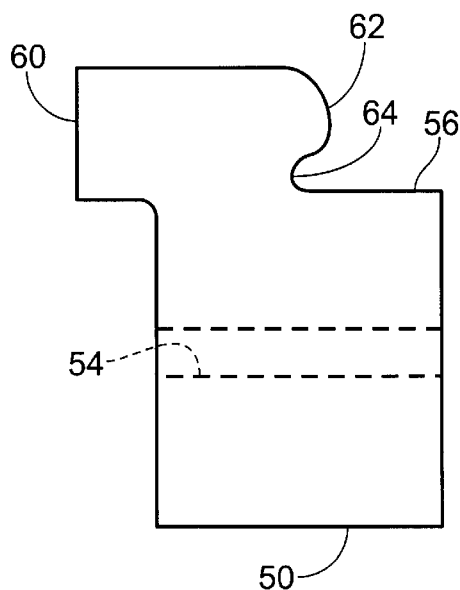

As can be seen in FIG. 8, lower clamp fingers 60 have a tongue 62 and a groove 64 extending horizontally across the rear thereof.

Pivotal die head 70 (see FIG. 4) is comprised of a transition section 71, a die plate 80, and a die tip 82.

Die head 70 is pivotally attached to adapter section 22 by means of a hinge 90, and can be rotated about hinge 90 by means of a handle 92.

Figure 6:
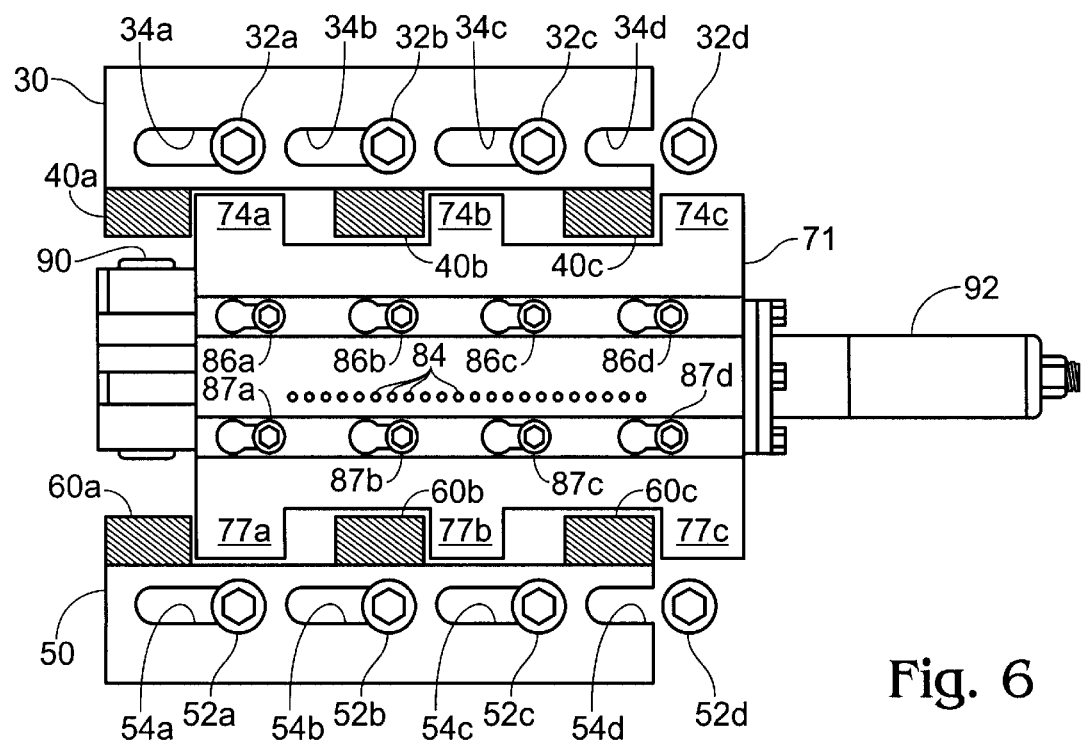
FIG. 6 is a front view of the die assembly showing the die head with its slidable clamp plates in their unlocked position.

Transition section 71 has a die cavity 72 which communicates with the cavity 24 of adapter section 22 and, thus, with the bore 18 of extruder barrel 10. Die cavity 72 communicates with the exterior of die assembly 70 via die orifice 84. Die orifice 84 can be a series of holes 84 for extruding strands of thermoplastic material, as illustrated in FIGS. 5 and 6, or a slot (not shown) for extruding a sheet of thermoplastic material.

Figure 4:
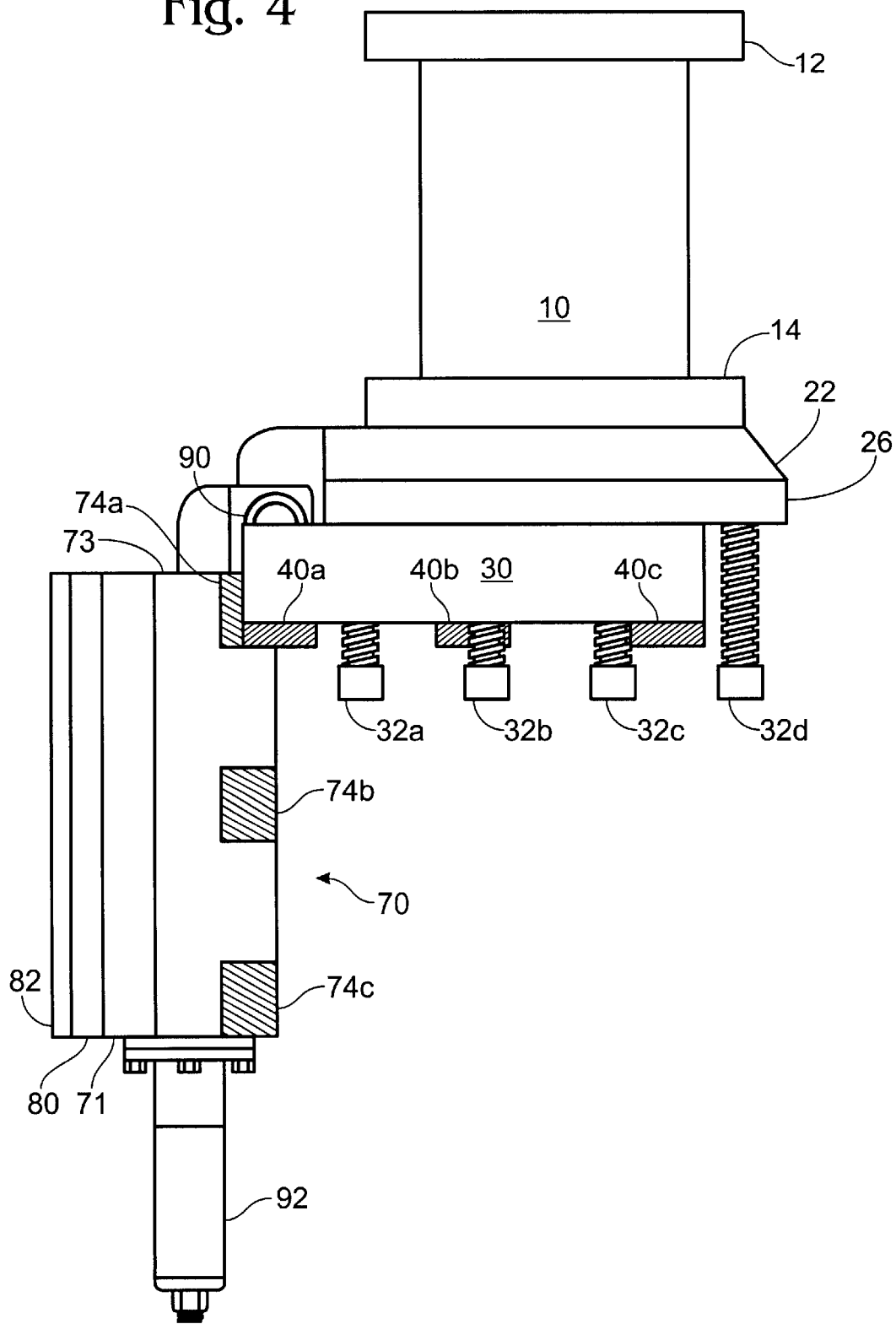
FIG. 4 is a top view of the die assembly of the invention showing the die head pivoted to its open position.
Figure 9:
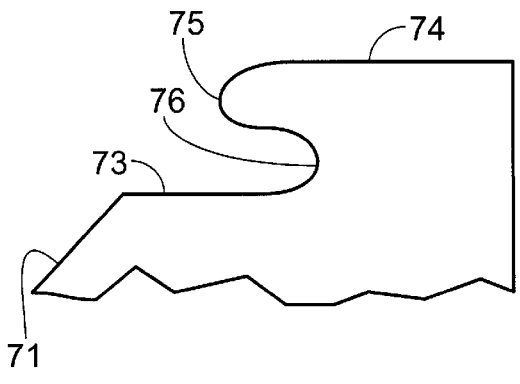
FIGS. 9 and 10 are side views of the upper and lower clamp ears of the transition section of the die assembly of the present invention.
Figure 10:
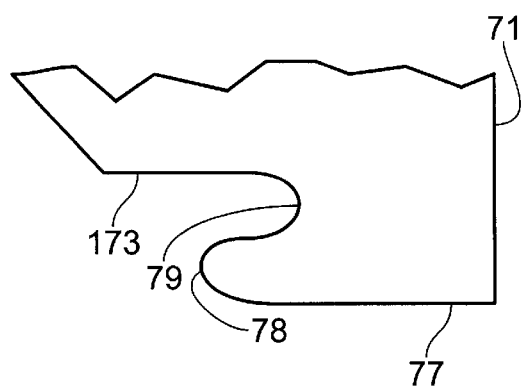

As seen by reference to FIGS. 9 and 10, transition section 71 has a flattened upper surface or ledge 73 and a flattened lower surface or ledge 173. Extending upwardly from the rear portion of flattened upper ledge 73 are three upper clamp ears 74a, 74b, and 74c, as best seen in FIGS. 4 and 6. As can be seen by reference to FIG. 9, each upper clamp ear 74 has a horizontal tongue 75 and groove 76 located in the front face thereof.

Extending downwardly from the rear portion of flattened lower ledge 173 are three lower clamp ears 77a, 77b, and 77c. As can be seen by reference to FIG. 10, each lower clamp ear 77 has a horizontal tongue 78 and groove 79 located in the front face thereof.

Die plate 80 is attached to transition section 71 by means of four upper bolts 86a, 86b, 86c, and 86d, and by four lower bolts 87a, 87b, 87c, and 87d. See FIGS. 5 and 6. Die plate 80 may be removed from transition section 71 by loosening bolts 86 and 87, and sliding die plate 80 to the right (as viewed in FIG. 5) so that the enlarged portion of the slots through which bolts 86 and 87 pass are aligned with the their heads to permit removal of die plate 80.

The transition section 71 of die head 70 also contains a breaker plate 88 seated in a suitable recess therein, and a screen pack 89 located in front of (upstream of) the breaker plate 88.

In operation, the die assembly of the invention is attached to flange 14 of barrel segment 10 by attaching adapter section 22 thereto by means of bolts (not shown) or other suitable attachment means.

During extrusion, pivotal die head 70 is in the closed and locked position shown in FIGS. 1–3 and 5. When it is desired to change screen pack 92 or otherwise clean die head 70, upper and lower clamp plate members 30 and 50 are moved out of locking position by loosening upper locking bolts 32 and lower locking bolts 52, respectively, and sliding clamp plate members 30 and 50 away from bolts 32 and 52. Although the clamp plate members 30 and 50, as illustrated, would be moved toward the hinge 90 side of the die assembly, it is clear that the clamp plate members 30 and 50 could be reversed so that they would be slid in the opposite direction to unlock die head 70.

Die head 70 is locked in the closed position by clamp plates 30 and 50 by virtue of the mating tongue and groove joints formed between the clamp fingers 40 and 60 of upper and lower clamp plate members 30 and 50 and the upper and lower clamp ears 74 and 77 of transition section 71, as best seen in FIG. 1. Sliding upper and lower clamp plate members 30 and 50 away from their locking bolts 32 and 52 slides their upper and lower clamp fingers 40 and 60 out of locking engagement with clamp ears 74 and 77 of transition section 71, thereby permitting pivotal die head 70 to be opened by grasping handle 92 and rotating die head 70 about hinge 90. In its open position, shown in FIG. 4, the screen pack 89 can be easily removed for cleaning or replacement, and the die head 70 otherwise cleaned.

Any electrical connections or thermocouple connections to die head 70 would be by means of flexible cables typically used for that purpose, but having sufficient length that they need not be disconnected when die head 70 is rotated to its open position for cleaning.

If it is desired to replace die plate 80, bolts 86 and 87 are loosened and die plate 80 slid horizontally away from them until their heads are aligned with the enlarged openings in their respective slots, whereupon die plate 80 may be pulled off for replacement.

The invention claimed is:

1. An extruder die assembly adapted for attachment to the output end of an extruder barrel, said die assembly comprising:

an adapter member for attachment to said output end of said barrel;

a die head including a transition section and a die plate, said transition section having a flattened upper horizontal surface, a flattened lower horizontal surface, and an outer face, said die plate being removably attached to said outer face of said transition section, said die head being pivotally attached to said adapter member by at least one hinge, said die head being rotatable about said hinge from a first, closed position in abutment with said adapter member to a second, open position not in abutment with said adapter member;

upper and lower clamp plates slidably attached to said adapter member and horizontally movable from a first, clamping position to a second, unclamped positions upper clamp plate having a plurality of clamp fingers depending from the bottom thereof and said lower clamp plate having a plurality of clamp fingers extending from the top thereof;

a plurality of upper clamp ears extending from said flattened upper horizontal surface of said transition section of said die head, said upper clamp ears being positioned and configured to be in contact with and lockingly engage said clamp fingers of said upper clamp plate when said upper clamp plate is in its clamping position, and to be out of contact with said clamp fingers of said upper clamp plate when said upper clamp plate is in its unclamped position; and a plurality of lower clamp ears extending from said flattened lower horizontal surface of said transition section of said die head, said lower clamp ears being positioned and configured to be in contact with and lockingly engage said clamp fingers of said lower clamp plate when said lower clamp plate is in its clamping position, and to be out of contact with said clamp fingers of said lower clamp plate when said lower clamp plate is in its unclamped position.

2. The die assembly of claim 1 wherein said die plate is removably attached to the outer face of said transition section of said die head by a plurality of bolts, said bolts having an enlarged head portion at their outer ends and are threaded at their narrower inner ends, said threaded ends being adapted to releasably mate with threaded holes located in said transition section of said die head, said bolts extending through elongated slots in said die plate, said slots having a width less than the width of said enlarged head portion of said bolts, said slots having an enlarged opening at one end thereof that is sufficiently large to allow the enlarged head portion of said bolts to pass therethrough when aligned therewith, whereby when said bolts are loosened and the die plate moved to a position wherein said bolt heads are aligned with said enlarged slot openings said die plate is removable from said die head.

3. The die assembly of claim 1 wherein said adapter and said die head have central cavities located therein adapted to communicate the cavity in an extruder barrel to which said die assembly is to be attached to the atmosphere.

4. The die assembly of claim 3 wherein said central cavities communicate with the atmosphere through a plurality of die holes located in said die plate.

5. The die assembly of claim 3 wherein said central cavities communicate with the atmosphere through an elongated slot located in said die plate.

6. The die assembly of claim 3 wherein a removable breaker plate is located across said die cavities.

7. The die assembly of claim 6 wherein a removable screen pack is located on the upstream side of said breaker plate.

8. The die assembly of claim 1 wherein each of said upper and lower clamp plates includes a plurality of horizontal slots and said adapter has a threaded opening in alignment with each of said horizontal slots, said upper and lower clamp plates being slidably attached to said adapter member by means of threaded locking bolts passing through said horizontal slots and into mating engagement with said threaded openings in said adapter member, said threaded locking bolts adapted to be tightened to hold said upper and lower clamp plates in their clamping position and adapted to be loosened to permit said upper and lower clamp plates to be horizontally moved to their unclamped position.

* * * * *